US008577703B2

(12) United States Patent
McClellan et al.

(10) Patent No.: US 8,577,703 B2
(45) Date of Patent: Nov. 5, 2013

(54) SYSTEM AND METHOD FOR CATEGORIZING DRIVING BEHAVIOR USING DRIVER MENTORING AND/OR MONITORING EQUIPMENT TO DETERMINE AN UNDERWRITING RISK

(75) Inventors: Scott McClellan, Heber City, UT (US); Todd Follmer, Coto de Caza, CA (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 954 days.

(21) Appl. No.: 11/779,176

(22) Filed: Jul. 17, 2007

(65) Prior Publication Data

US 2009/0024419 A1    Jan. 22, 2009

(51) Int. Cl.
*G06Q 40/00*    (2012.01)

(52) U.S. Cl.
USPC .......................................... 705/7.11; 705/7.42

(58) Field of Classification Search
USPC ........................................ 705/4, 7.11, 7.42
See application file for complete search history.

(56) References Cited

U.S. PATENT DOCUMENTS

| | | |
|---|---|---|
| 3,975,708 A | 8/1976 | Lusk |
| 4,369,427 A | 1/1983 | Drebinger et al. |
| 4,395,624 A | 7/1983 | Wartski |
| 4,419,654 A | 12/1983 | Funk |
| 4,458,535 A | 7/1984 | Juergens |
| 4,785,280 A | 11/1988 | Fubini |
| 4,926,417 A | 5/1990 | Futami |
| 4,939,652 A | 7/1990 | Steiner |
| 5,032,821 A | 7/1991 | Domanico |
| 5,119,504 A | 6/1992 | Durboraw, III |
| 5,223,844 A | 6/1993 | Mansell et al. |
| 5,225,842 A | 7/1993 | Brown et al. |
| 5,303,163 A | 4/1994 | Ebaugh et al. ................ 364/550 |
| 5,305,214 A | 4/1994 | Komatsu |
| 5,309,139 A | 5/1994 | Austin |
| 5,311,197 A | 5/1994 | Sorden et al. |
| 5,325,082 A | 6/1994 | Rodriguez |
| 5,347,260 A | 9/1994 | Ginzel |
| 5,359,528 A | 10/1994 | Haendel |
| 5,365,114 A | 11/1994 | Tsurushima |
| 5,365,451 A | 11/1994 | Wang et al. |
| 5,394,136 A | 2/1995 | Lammers et al. |

(Continued)

FOREIGN PATENT DOCUMENTS

| | | |
|---|---|---|
| CA | 2071931 | 12/1993 |
| DE | 197 00 353 A1 | 7/1998 |

(Continued)

OTHER PUBLICATIONS

International Report on Patentability, Jan 28, 2010, WIPO.

(Continued)

*Primary Examiner* — Thomas Dixon
*Assistant Examiner* — Benjamin S Fields
(74) *Attorney, Agent, or Firm* — Workman Nydegger

(57) ABSTRACT

System and method for monitoring and mentoring driver behavior and vehicle operation and for categorizing or grading a driver's performance. The driver's classification or grade is used to determine or adjust insurance rates, premiums or coverages for the driver. The driver may receive discounted insurance rates for using monitoring and/or mentoring equipment in the vehicle. Insurance companies may use the driver classifications or grades to bid for coverage of groups of drivers having similar classifications or grades.

13 Claims, 2 Drawing Sheets

(56) References Cited

U.S. PATENT DOCUMENTS

| | | |
|---|---|---|
| 5,400,018 A | 3/1995 | Scholl |
| 5,414,432 A | 5/1995 | Penny, Jr. et al. |
| 5,422,624 A | 6/1995 | Smith |
| 5,424,584 A | 6/1995 | Matsuda |
| 5,430,432 A | 7/1995 | Camhi |
| 5,436,612 A | 7/1995 | Aduddell |
| 5,436,837 A | 7/1995 | Gerstung |
| 5,446,659 A | 8/1995 | Yamawaki |
| 5,453,939 A | 9/1995 | Hoffman |
| 5,457,439 A | 10/1995 | Kuhn |
| 5,475,597 A | 12/1995 | Buck |
| 5,485,161 A | 1/1996 | Vaughn |
| 5,499,182 A | 3/1996 | Ousborne |
| 5,521,579 A | 5/1996 | Bernhard |
| 5,521,580 A | 5/1996 | Kaneko |
| 5,525,960 A | 6/1996 | McCall |
| 5,548,273 A | 8/1996 | Nicol |
| 5,570,087 A * | 10/1996 | Lemelson ................ 340/870.05 |
| 5,581,464 A | 12/1996 | Woll |
| 5,586,130 A | 12/1996 | Doyle |
| 5,600,558 A | 2/1997 | Mearek |
| 5,612,875 A | 3/1997 | Haendel |
| 5,625,337 A | 4/1997 | Medawar |
| 5,638,077 A | 6/1997 | Martin |
| 5,642,284 A | 6/1997 | Parupalli |
| 5,648,755 A | 7/1997 | Yagihashi |
| 5,659,289 A | 8/1997 | Zonkoski |
| 5,689,067 A | 11/1997 | Klein |
| 5,708,417 A | 1/1998 | Tallman |
| 5,717,374 A | 2/1998 | Smith |
| 5,719,771 A | 2/1998 | Buck |
| 5,723,768 A | 3/1998 | Ammon |
| 5,740,548 A | 4/1998 | Hudgens |
| 5,742,915 A | 4/1998 | Stafford |
| 5,751,245 A | 5/1998 | Janky et al. |
| 5,764,139 A | 6/1998 | Nojima |
| 5,767,767 A | 6/1998 | Lima |
| 5,777,580 A | 7/1998 | Janky et al. |
| 5,795,997 A | 8/1998 | Gittins |
| 5,797,134 A | 8/1998 | McMillan et al. |
| 5,801,618 A | 9/1998 | Jenkins |
| 5,801,948 A | 9/1998 | Wood |
| 5,815,071 A | 9/1998 | Doyle |
| 5,825,283 A | 10/1998 | Camhi |
| 5,825,284 A | 10/1998 | Dunwoody |
| 5,844,475 A | 12/1998 | Horie |
| 5,847,271 A | 12/1998 | Poublon |
| 5,862,500 A | 1/1999 | Goodwin |
| 5,867,093 A | 2/1999 | Dodd |
| 5,877,678 A | 3/1999 | Donoho |
| 5,880,674 A | 3/1999 | Ufkes |
| 5,880,958 A | 3/1999 | Helms et al. |
| 5,883,594 A | 3/1999 | Lau |
| 5,892,434 A | 4/1999 | Carlson |
| 5,907,277 A | 5/1999 | Tokunaga |
| 5,914,654 A | 6/1999 | Smith |
| 5,918,180 A | 6/1999 | Dimino |
| 5,926,087 A | 7/1999 | Busch |
| 5,928,291 A | 7/1999 | Jenkins et al. |
| 5,941,915 A | 8/1999 | Federle et al. .................... 701/1 |
| 5,945,919 A | 8/1999 | Trask |
| 5,949,330 A | 9/1999 | Hoffman |
| 5,949,331 A | 9/1999 | Schofield |
| 5,954,781 A | 9/1999 | Slepian |
| 5,955,942 A | 9/1999 | Slifkin |
| 5,957,986 A | 9/1999 | Coverdill |
| 5,964,816 A | 10/1999 | Kincaid |
| 5,969,600 A | 10/1999 | Tanguay |
| 5,974,356 A | 10/1999 | Doyle et al. |
| 5,978,737 A | 11/1999 | Pawlowski |
| 5,982,278 A | 11/1999 | Cuvelier |
| 5,987,976 A | 11/1999 | Sarangapani |
| 5,999,125 A | 12/1999 | Kurby |
| 6,002,327 A | 12/1999 | Boesch |
| 6,008,724 A | 12/1999 | Thompson |
| 6,018,293 A | 1/2000 | Smith |
| 6,026,292 A | 2/2000 | Coppinger et al. |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,060,989 A * | 5/2000 | Gehlot ........................ 340/576 |
| 6,064,928 A | 5/2000 | Wilson |
| 6,064,970 A | 5/2000 | McMillan et al. |
| 6,067,008 A | 5/2000 | Smith |
| 6,067,009 A | 5/2000 | Hozuka |
| 6,072,388 A | 6/2000 | Kyrtsos |
| 6,073,007 A | 6/2000 | Doyle |
| 6,075,458 A | 6/2000 | Ladner et al. |
| 6,078,853 A | 6/2000 | Ebner |
| 6,081,188 A | 6/2000 | Kutlucinar |
| 6,084,870 A | 7/2000 | Wooten et al. |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,108,591 A | 8/2000 | Segal et al. |
| 6,121,922 A | 9/2000 | Mohan |
| 6,124,810 A | 9/2000 | Segal et al. |
| 6,130,608 A | 10/2000 | McKeown |
| 6,131,067 A | 10/2000 | Girerd et al. |
| 6,133,827 A | 10/2000 | Alvey |
| 6,141,610 A | 10/2000 | Rothert |
| 6,147,598 A | 11/2000 | Murphy |
| 6,172,602 B1 | 1/2001 | Hasfjord |
| 6,178,374 B1 | 1/2001 | Möhlenkamp et al. ....... 701/117 |
| 6,184,784 B1 | 2/2001 | Shibuya |
| 6,185,501 B1 | 2/2001 | Smith |
| 6,198,995 B1 | 3/2001 | Settles |
| 6,204,756 B1 | 3/2001 | Senyk |
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Goebel |
| 6,222,458 B1 | 4/2001 | Harris |
| 6,225,898 B1 | 5/2001 | Kamiya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,247,360 B1 | 6/2001 | Anderson |
| 6,249,219 B1 | 6/2001 | Perez |
| 6,253,129 B1 * | 6/2001 | Jenkins et al. ............... 701/32.3 |
| 6,255,892 B1 | 7/2001 | Gartner et al. |
| 6,255,939 B1 | 7/2001 | Roth et al. |
| 6,262,658 B1 | 7/2001 | O'Connor |
| 6,265,989 B1 | 7/2001 | Taylor |
| 6,266,588 B1 | 7/2001 | McClellan |
| 6,278,361 B1 | 8/2001 | Magiawala |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,306,063 B1 | 10/2001 | Horgan et al. ................ 477/108 |
| 6,308,120 B1 | 10/2001 | Good |
| 6,308,134 B1 | 10/2001 | Croyle et al. |
| 6,313,742 B1 | 11/2001 | Larson |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Bchler |
| 6,339,739 B1 | 1/2002 | Folke |
| 6,339,745 B1 | 1/2002 | Novik ........................ 701/208 |
| 6,344,805 B1 | 2/2002 | Yasui |
| 6,351,211 B1 | 2/2002 | Bussard |
| 6,356,188 B1 | 3/2002 | Meyers |
| 6,356,822 B1 | 3/2002 | Diaz |
| 6,356,833 B2 | 3/2002 | Jeon |

(56) References Cited

U.S. PATENT DOCUMENTS

| | | | |
|---|---|---|---|
| 6,356,836 B1 | 3/2002 | Adolph | 701/208 |
| 6,359,554 B1 | 3/2002 | Skibinski | |
| 6,362,730 B2 | 3/2002 | Razavi | |
| 6,362,734 B1 | 3/2002 | McQuade | |
| 6,366,199 B1 | 4/2002 | Osborn | |
| 6,378,959 B2 | 4/2002 | Lesesky | |
| 6,389,340 B1 | 5/2002 | Rayner | |
| 6,393,348 B1 | 5/2002 | Ziegler | |
| 6,404,329 B1 | 6/2002 | Hsu | |
| 6,405,112 B1 | 6/2002 | Rayner | |
| 6,405,128 B1 | 6/2002 | Bechtolsheim et al. | 701/208 |
| 6,415,226 B1 * | 7/2002 | Kozak | 701/411 |
| 6,424,268 B1 | 7/2002 | Isonaga | |
| 6,427,687 B1 | 8/2002 | Kirk | |
| 6,430,488 B1 | 8/2002 | Goldman | |
| 6,433,681 B1 | 8/2002 | Foo et al. | |
| 6,441,732 B1 | 8/2002 | Laitsaari | |
| 6,449,540 B1 | 9/2002 | Rayner | |
| 6,459,367 B1 | 10/2002 | Green | |
| 6,459,369 B1 | 10/2002 | Wang | |
| 6,459,961 B1 | 10/2002 | Obradovich | |
| 6,459,969 B1 | 10/2002 | Bates | |
| 6,462,675 B1 | 10/2002 | Humphrey | |
| 6,472,979 B2 | 10/2002 | Schofield | |
| 6,476,763 B2 | 11/2002 | Allen, Jr. | |
| 6,480,106 B1 | 11/2002 | Crombez | |
| 6,484,035 B2 | 11/2002 | Allen, Jr. | |
| 6,484,091 B2 | 11/2002 | Shibata | |
| 6,493,650 B1 | 12/2002 | Rodgers | |
| 6,512,969 B1 | 1/2003 | Wang | |
| 6,515,596 B2 | 2/2003 | Awada | |
| 6,519,512 B1 | 2/2003 | Haas | |
| 6,525,672 B2 | 2/2003 | Chainer | |
| 6,526,341 B1 | 2/2003 | Bird et al. | |
| 6,529,159 B1 | 3/2003 | Fan et al. | |
| 6,535,116 B1 | 3/2003 | Zhou | |
| 6,542,074 B1 | 4/2003 | Tharman | |
| 6,542,794 B2 | 4/2003 | Obradovich | |
| 6,549,834 B2 | 4/2003 | McClellan | |
| 6,552,682 B1 | 4/2003 | Fan | |
| 6,556,905 B1 | 4/2003 | Mittelsteadt | |
| 6,559,769 B2 | 5/2003 | Anthony | |
| 6,564,126 B1 | 5/2003 | Lin | |
| 6,567,000 B2 | 5/2003 | Slifkin | |
| 6,571,168 B1 | 5/2003 | Murphy | |
| 6,587,759 B2 | 7/2003 | Obradovich | |
| 6,594,579 B1 | 7/2003 | Lowrey | |
| 6,599,243 B2 | 7/2003 | Woltermann | |
| 6,600,985 B2 | 7/2003 | Weaver | |
| 6,604,033 B1 | 8/2003 | Banet | |
| 6,609,063 B1 | 8/2003 | Bender et al. | 701/209 |
| 6,609,064 B1 | 8/2003 | Dean | 701/213 |
| 6,611,740 B2 | 8/2003 | Lowrey | |
| 6,611,755 B2 | 8/2003 | Coffee | |
| 6,622,085 B1 | 9/2003 | Amita et al. | 701/208 |
| 6,629,029 B1 | 9/2003 | Giles | |
| 6,630,884 B1 | 10/2003 | Shanmugham | |
| 6,631,322 B1 | 10/2003 | Arthur et al. | 701/211 |
| 6,636,790 B1 | 10/2003 | Lightner | |
| 6,639,512 B1 | 10/2003 | Lee | |
| 6,643,578 B2 | 11/2003 | Levine | |
| 6,651,001 B2 | 11/2003 | Apsell | |
| 6,654,682 B2 | 11/2003 | Kane et al. | |
| 6,657,540 B2 | 12/2003 | Knapp | |
| 6,662,013 B2 | 12/2003 | Takiguchi et al. | |
| 6,662,141 B2 | 12/2003 | Kaub | 702/181 |
| 6,664,922 B1 | 12/2003 | Fan | |
| 6,665,613 B2 | 12/2003 | Duvall | |
| 6,674,362 B2 | 1/2004 | Yoshioka | |
| 6,675,085 B2 | 1/2004 | Straub | |
| 6,677,854 B2 | 1/2004 | Dix | |
| 6,678,612 B1 | 1/2004 | Khawam | |
| 6,696,932 B2 | 2/2004 | Skibinski | |
| 6,703,925 B2 | 3/2004 | Steffel | |
| 6,710,738 B2 | 3/2004 | Allen, Jr. | |
| 6,714,894 B1 | 3/2004 | Tobey et al. | 702/188 |
| 6,718,235 B1 | 4/2004 | Borugian | |
| 6,718,239 B2 | 4/2004 | Rayner | |
| 6,727,809 B1 | 4/2004 | Smith | |
| 6,728,605 B2 | 4/2004 | Lash | |
| 6,732,031 B1 | 5/2004 | Lightner | |
| 6,732,032 B1 | 5/2004 | Banet | |
| 6,737,962 B2 | 5/2004 | Mayor | |
| 6,741,169 B2 | 5/2004 | Magiawala | |
| 6,741,170 B2 | 5/2004 | Alrabady | |
| 6,745,153 B2 | 6/2004 | White | |
| 6,748,322 B1 | 6/2004 | Fernandez | |
| 6,750,761 B1 | 6/2004 | Newman | |
| 6,750,762 B1 | 6/2004 | Porter | |
| 6,756,916 B2 | 6/2004 | Yanai | |
| 6,759,952 B2 | 7/2004 | Dunbridge | |
| 6,766,244 B2 | 7/2004 | Obata et al. | 701/207 |
| 6,768,448 B2 | 7/2004 | Farmer | |
| 6,775,602 B2 | 8/2004 | Gordon | |
| 6,778,068 B2 | 8/2004 | Wolfe | |
| 6,778,885 B2 | 8/2004 | Agashe et al. | |
| 6,784,793 B2 | 8/2004 | Gagnon | |
| 6,784,832 B2 | 8/2004 | Knockeart et al. | |
| 6,788,196 B2 | 9/2004 | Ueda | |
| 6,788,207 B2 | 9/2004 | Wilkerson | |
| 6,792,339 B2 | 9/2004 | Basson | |
| 6,795,017 B1 | 9/2004 | Puranik et al. | |
| 6,798,354 B2 | 9/2004 | Schuessler | |
| 6,803,854 B1 | 10/2004 | Adams et al. | |
| 6,807,481 B1 | 10/2004 | Gastelum | |
| 6,813,549 B2 | 11/2004 | Good | |
| 6,819,236 B2 | 11/2004 | Kawai | |
| 6,832,141 B2 | 12/2004 | Skeen et al. | |
| 6,845,314 B2 | 1/2005 | Fosseen | |
| 6,845,316 B2 | 1/2005 | Yates | 701/117 |
| 6,845,317 B2 | 1/2005 | Craine | |
| 6,847,871 B2 | 1/2005 | Malik et al. | 701/33 |
| 6,847,872 B2 | 1/2005 | Bodin | |
| 6,847,873 B1 | 1/2005 | Li | |
| 6,847,887 B1 | 1/2005 | Casino | 701/208 |
| 6,850,841 B1 | 2/2005 | Casino | 701/208 |
| 6,859,039 B2 | 2/2005 | Horie | |
| 6,859,695 B2 | 2/2005 | Klausner | |
| 6,865,457 B1 | 3/2005 | Mittelsteadt | |
| 6,867,733 B2 | 3/2005 | Sandhu et al. | |
| 6,868,386 B1 | 3/2005 | Henderson et al. | |
| 6,870,469 B2 | 3/2005 | Ueda | |
| 6,873,253 B2 | 3/2005 | Veziris | |
| 6,873,261 B2 | 3/2005 | Anthony | |
| 6,879,894 B1 | 4/2005 | Lightner | |
| 6,885,293 B2 | 4/2005 | Okumura | |
| 6,892,131 B2 | 5/2005 | Coffee | |
| 6,894,606 B2 | 5/2005 | Forbes et al. | 340/435 |
| 6,895,332 B2 | 5/2005 | King | |
| 6,909,398 B2 | 6/2005 | Knockeart et al. | |
| 6,914,523 B2 | 7/2005 | Munch | |
| 6,922,133 B2 | 7/2005 | Wolfe | |
| 6,922,616 B2 | 7/2005 | Obradovich | |
| 6,922,622 B2 | 7/2005 | Dulin | |
| 6,925,425 B2 | 8/2005 | Remboski | |
| 6,928,348 B1 | 8/2005 | Lightner | |
| 6,937,162 B2 | 8/2005 | Tokitsu | |
| 6,950,013 B2 | 9/2005 | Scaman | |
| 6,954,140 B2 | 10/2005 | Holler | |
| 6,958,976 B2 | 10/2005 | Kikkawa | |
| 6,965,827 B1 | 11/2005 | Wolfson | 701/207 |
| 6,968,311 B2 | 11/2005 | Knockeart et al. | |
| 6,970,075 B2 | 11/2005 | Cherouny | |
| 6,970,783 B2 | 11/2005 | Knockeart et al. | |
| 6,972,669 B2 | 12/2005 | Saito | |
| 6,980,131 B1 | 12/2005 | Taylor | |
| 6,981,565 B2 | 1/2006 | Gleacher | |
| 6,982,636 B1 | 1/2006 | Bennie | |
| 6,983,200 B2 | 1/2006 | Bodin | |
| 6,988,033 B1 | 1/2006 | Lowrey | |
| 6,988,034 B1 | 1/2006 | Marlatt et al. | 701/200 |
| 6,989,739 B2 | 1/2006 | Li | |
| 7,002,454 B1 | 2/2006 | Gustafson | |
| 7,002,579 B2 | 2/2006 | Olson | |

(56) References Cited

U.S. PATENT DOCUMENTS

| | | | |
|---|---|---|---|
| 7,005,975 B2 | 2/2006 | Lehner | |
| 7,006,820 B1 | 2/2006 | Parker et al. | |
| 7,019,641 B1 | 3/2006 | Lakshmanan | |
| 7,023,321 B2 | 4/2006 | Brillon et al. | |
| 7,023,332 B2 | 4/2006 | Saito | |
| 7,024,318 B2 | 4/2006 | Fischer | |
| 7,027,808 B2 | 4/2006 | Wesby | |
| 7,034,705 B2 | 4/2006 | Yoshioka | |
| 7,038,578 B2 | 5/2006 | Will | |
| 7,042,347 B2 | 5/2006 | Cherouny | |
| 7,047,114 B1 | 5/2006 | Rogers | |
| 7,049,941 B2 | 5/2006 | Rivera-Cintron | |
| 7,054,742 B2 | 5/2006 | Khavakh et al. | 701/209 |
| 7,059,689 B2 | 6/2006 | Lesesky | |
| 7,069,126 B2 | 6/2006 | Bernard | |
| 7,069,134 B2 | 6/2006 | Williams | |
| 7,072,753 B2 | 7/2006 | Eberle | |
| 7,081,811 B2 | 7/2006 | Johnston | |
| 7,084,755 B1 | 8/2006 | Nord | |
| 7,088,225 B2 | 8/2006 | Yoshioka | |
| 7,089,116 B2 | 8/2006 | Smith | |
| 7,091,880 B2 | 8/2006 | Sorensen | |
| 7,098,812 B2 | 8/2006 | Hirota | |
| 7,099,750 B2 | 8/2006 | Miyazawa | |
| 7,099,774 B2 | 8/2006 | King | |
| 7,102,496 B1 | 9/2006 | Ernst | |
| 7,109,853 B1 | 9/2006 | Mattson | |
| 7,113,081 B1 | 9/2006 | Reichow | |
| 7,113,107 B2 | 9/2006 | Taylor | |
| 7,117,075 B1 | 10/2006 | Larschan et al. | |
| 7,119,696 B2 | 10/2006 | Borugian | |
| 7,124,027 B1 | 10/2006 | Ernst | |
| 7,124,088 B2 | 10/2006 | Bauer et al. | |
| 7,129,825 B2 | 10/2006 | Weber | |
| 7,132,934 B2 | 11/2006 | Allison | |
| 7,132,937 B2 | 11/2006 | Lu | |
| 7,132,938 B2 | 11/2006 | Suzuki | |
| 7,133,755 B2 | 11/2006 | Salman | |
| 7,135,983 B2 | 11/2006 | Filippov | |
| 7,138,916 B2 | 11/2006 | Schwartz | |
| 7,139,661 B2 | 11/2006 | Holze | |
| 7,145,442 B1 | 12/2006 | Wai | |
| 7,149,206 B2 | 12/2006 | Pruzan | |
| 7,155,321 B2 | 12/2006 | Bromley et al. | 701/29 |
| 7,161,473 B2 | 1/2007 | Hoshal | |
| 7,164,986 B2 | 1/2007 | Humphries | |
| 7,170,390 B2 | 1/2007 | Quiñones | |
| 7,170,400 B2 | 1/2007 | Cowelchuk | |
| 7,174,243 B1 | 2/2007 | Lightner | |
| 7,180,407 B1 | 2/2007 | Guo | |
| 7,180,409 B2 | 2/2007 | Brey | |
| 7,187,271 B2 | 3/2007 | Nagata | |
| 7,196,629 B2 | 3/2007 | Ruoss | |
| 7,197,500 B1 | 3/2007 | Israni et al. | 707/100 |
| 7,216,022 B2 | 5/2007 | Kynast et al. | 701/1 |
| 7,216,035 B2 | 5/2007 | Hörtner | |
| 7,218,211 B2 | 5/2007 | Ho | |
| 7,222,009 B2 | 5/2007 | Hijikata | |
| 7,225,065 B1 | 5/2007 | Hunt | |
| 7,228,211 B1 | 6/2007 | Lowrey | |
| 7,233,235 B2 | 6/2007 | Pavlish | |
| 7,236,862 B2 | 6/2007 | Kanno | |
| 7,239,948 B2 | 7/2007 | Nimmo et al. | |
| 7,256,686 B2 | 8/2007 | Koutsky | |
| 7,256,700 B1 | 8/2007 | Ruocco | |
| 7,256,702 B2 | 8/2007 | Isaacs | |
| 7,260,497 B2 | 8/2007 | Watabe | |
| RE39,845 E | 9/2007 | Hasfjord | |
| 7,269,507 B2 | 9/2007 | Cayford | 701/208 |
| 7,269,530 B1 | 9/2007 | Lin | |
| 7,271,716 B2 | 9/2007 | Nou | |
| 7,273,172 B2 | 9/2007 | Olsen | |
| 7,280,046 B2 | 10/2007 | Berg | |
| 7,283,904 B2 | 10/2007 | Benjamin | |
| 7,286,917 B2 | 10/2007 | Hawkins | |
| 7,286,929 B2 | 10/2007 | Staton | |
| 7,289,024 B2 | 10/2007 | Sumcad | |
| 7,289,035 B2 | 10/2007 | Nathan | |
| 7,292,152 B2 | 11/2007 | Torkkola | |
| 7,292,159 B2 | 11/2007 | Culpepper | |
| 7,298,248 B2 | 11/2007 | Finley | |
| 7,298,249 B2 | 11/2007 | Avery | |
| 7,301,445 B2 | 11/2007 | Moughler | |
| 7,317,383 B2 | 1/2008 | Ihara | |
| 7,317,392 B2 | 1/2008 | DuRocher | |
| 7,317,927 B2 | 1/2008 | Staton | |
| 7,319,848 B2 | 1/2008 | Obradovich | |
| 7,321,294 B2 | 1/2008 | Mizumaki | |
| 7,321,825 B2 | 1/2008 | Ranalli | |
| 7,323,972 B2 | 1/2008 | Nobusawa | |
| 7,323,974 B2 | 1/2008 | Schmid | |
| 7,323,982 B2 | 1/2008 | Staton | |
| 7,327,239 B2 | 2/2008 | Gallant | |
| 7,327,258 B2 | 2/2008 | Fast | |
| 7,333,883 B2 | 2/2008 | Geborek | |
| 7,339,460 B2 | 3/2008 | Lane | |
| 7,349,782 B2 | 3/2008 | Churchill | |
| 7,352,081 B2 | 4/2008 | Taurasi | |
| 7,355,508 B2 | 4/2008 | Mian | |
| 7,365,639 B2 | 4/2008 | Yuhara | |
| 7,366,551 B1 | 4/2008 | Hartley | |
| 7,375,624 B2 | 5/2008 | Hines | |
| 7,376,499 B2 | 5/2008 | Salman | |
| 7,378,946 B2 | 5/2008 | Lahr | |
| 7,378,949 B2 | 5/2008 | Chen | |
| 7,386,394 B2 | 6/2008 | Shulman | |
| 7,421,334 B2 | 9/2008 | Dahlgren et al. | 701/117 |
| 7,433,889 B1 | 10/2008 | Barton | 707/104.1 |
| 7,447,509 B2 | 11/2008 | Cossins et al. | 455/457 |
| 7,499,949 B2 | 3/2009 | Barton | 707/104.1 |
| 7,565,230 B2 | 7/2009 | Gardner et al. | 701/35 |
| 7,584,033 B2 * | 9/2009 | Mittelsteadt et al. | 701/33.4 |
| 7,880,642 B2 | 2/2011 | Gueziec | 340/905 |
| 7,898,388 B2 | 3/2011 | Ehrman et al. | 340/5.8 |
| 7,941,258 B1 | 5/2011 | Mittelsteadt et al. | 701/35 |
| 2001/0018628 A1 | 8/2001 | Jenkins et al. | 701/35 |
| 2002/0024444 A1 | 2/2002 | Hiyama et al. | 340/576 |
| 2002/0111725 A1 | 8/2002 | Burge | 701/29 |
| 2003/0055555 A1 | 3/2003 | Knockeart et al. | |
| 2004/0039504 A1 | 2/2004 | Coffee et al. | |
| 2004/0066330 A1 | 4/2004 | Knockeart et al. | |
| 2004/0077339 A1 | 4/2004 | Martens | |
| 2004/0083041 A1 | 4/2004 | Skeen et al. | |
| 2004/0142672 A1 | 7/2004 | Stankewitz | |
| 2004/0210353 A1 | 10/2004 | Rice | 701/1 |
| 2004/0236474 A1 | 11/2004 | Chowdhary et al. | 701/1 |
| 2004/0260579 A1 | 12/2004 | Tremiti | |
| 2005/0064835 A1 | 3/2005 | Gusler | |
| 2005/0065711 A1 | 3/2005 | Dahlgren et al. | 701/117 |
| 2005/0091018 A1 | 4/2005 | Craft | |
| 2005/0091175 A9 | 4/2005 | Farmer | |
| 2005/0096809 A1 | 5/2005 | Skeen et al. | |
| 2005/0137757 A1 | 6/2005 | Phelan et al. | |
| 2006/0154687 A1 | 7/2006 | McDowell | |
| 2006/0234711 A1 | 10/2006 | McArdle | |
| 2006/0253307 A1 * | 11/2006 | Warren et al. | 705/4 |
| 2007/0005404 A1 | 1/2007 | Raz et al. | |
| 2007/0061155 A1 | 3/2007 | Ji et al. | 705/1 |
| 2007/0229234 A1 | 10/2007 | Smith | |
| 2007/0293206 A1 | 12/2007 | Lund | |
| 2008/0064413 A1 | 3/2008 | Breed | |
| 2008/0255888 A1 | 10/2008 | Berkobin | |

FOREIGN PATENT DOCUMENTS

| | | |
|---|---|---|
| JP | 2007235530 | 9/2007 |
| WO | WO2005109369 | 11/2005 |
| WO | WO2008109477 | 9/2008 |

OTHER PUBLICATIONS

Ogle, et al.; *Accuracy of Global Positioning System for Determining Driver Performance Parameters*; Transportation Research Record 1818; Paper No. 02-1063; pp. 12-24, unknown.

(56) References Cited

OTHER PUBLICATIONS

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

*European Patent Office; Extended European Search Report* for Application No. 08826395.9—1238 / 2191433; 7 pages, Apr. 25, 2012.

EP, Application No: 08 826 395.9—1238, Ref: P039550EP CLM, Communication pursuant to Article 94(3) EPC, 7 pages, Jan. 28, 2013.

\* cited by examiner

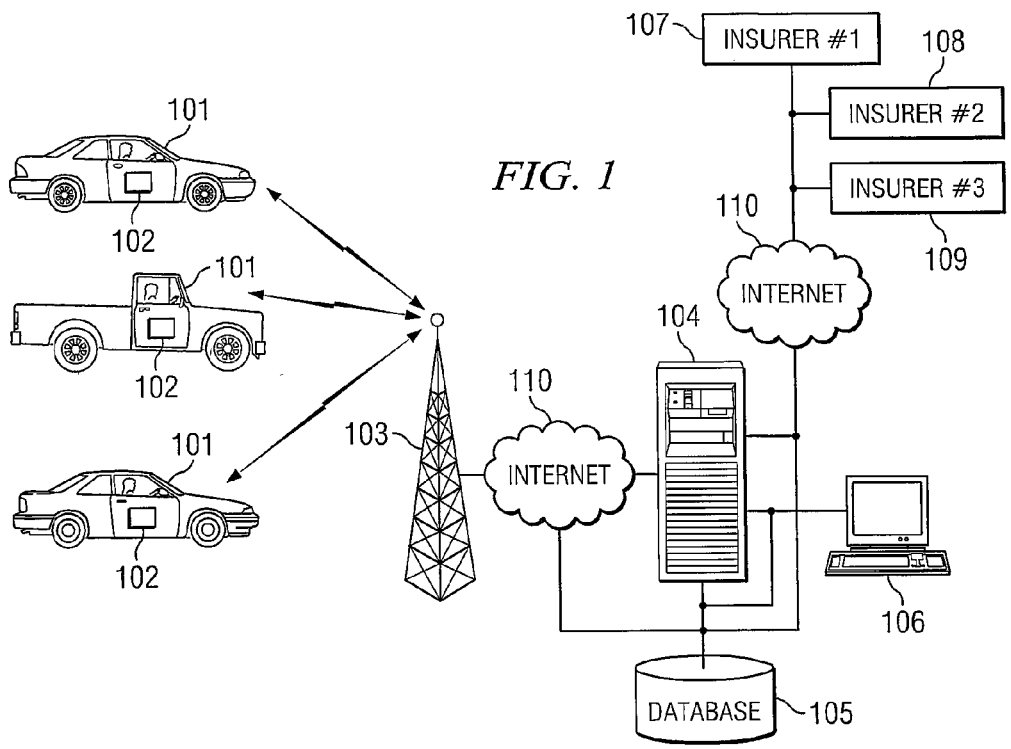

FIG. 1

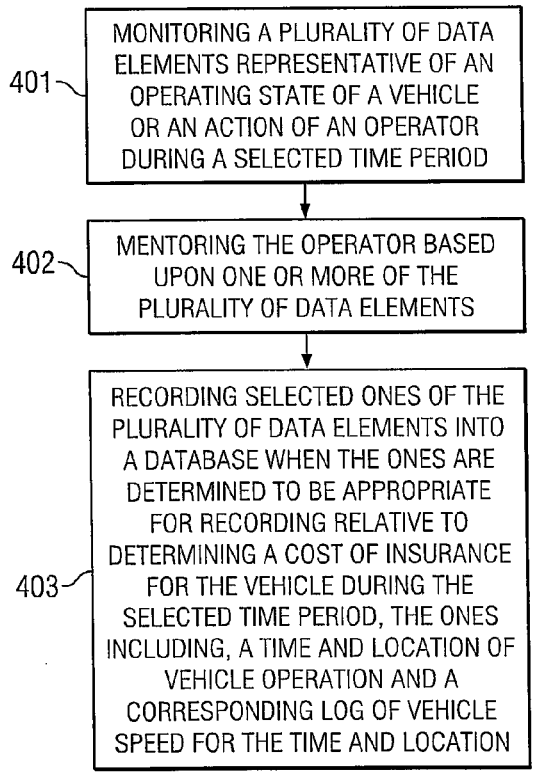

FIG. 4

401 — MONITORING A PLURALITY OF DATA ELEMENTS REPRESENTATIVE OF AN OPERATING STATE OF A VEHICLE OR AN ACTION OF AN OPERATOR DURING A SELECTED TIME PERIOD

402 — MENTORING THE OPERATOR BASED UPON ONE OR MORE OF THE PLURALITY OF DATA ELEMENTS

403 — RECORDING SELECTED ONES OF THE PLURALITY OF DATA ELEMENTS INTO A DATABASE WHEN THE ONES ARE DETERMINED TO BE APPROPRIATE FOR RECORDING RELATIVE TO DETERMINING A COST OF INSURANCE FOR THE VEHICLE DURING THE SELECTED TIME PERIOD, THE ONES INCLUDING, A TIME AND LOCATION OF VEHICLE OPERATION AND A CORRESPONDING LOG OF VEHICLE SPEED FOR THE TIME AND LOCATION

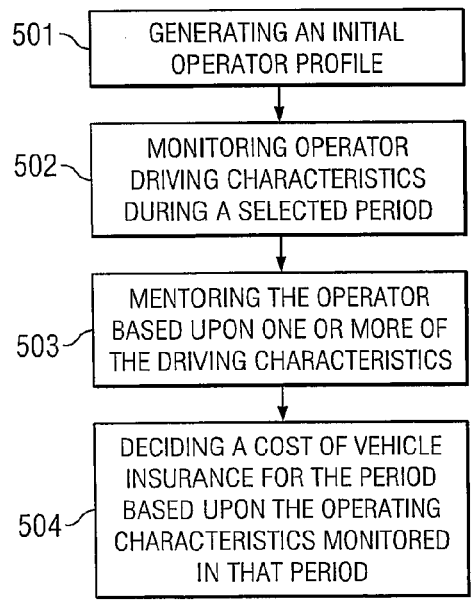

FIG. 5

501 — GENERATING AN INITIAL OPERATOR PROFILE

502 — MONITORING OPERATOR DRIVING CHARACTERISTICS DURING A SELECTED PERIOD

503 — MENTORING THE OPERATOR BASED UPON ONE OR MORE OF THE DRIVING CHARACTERISTICS

504 — DECIDING A COST OF VEHICLE INSURANCE FOR THE PERIOD BASED UPON THE OPERATING CHARACTERISTICS MONITORED IN THAT PERIOD

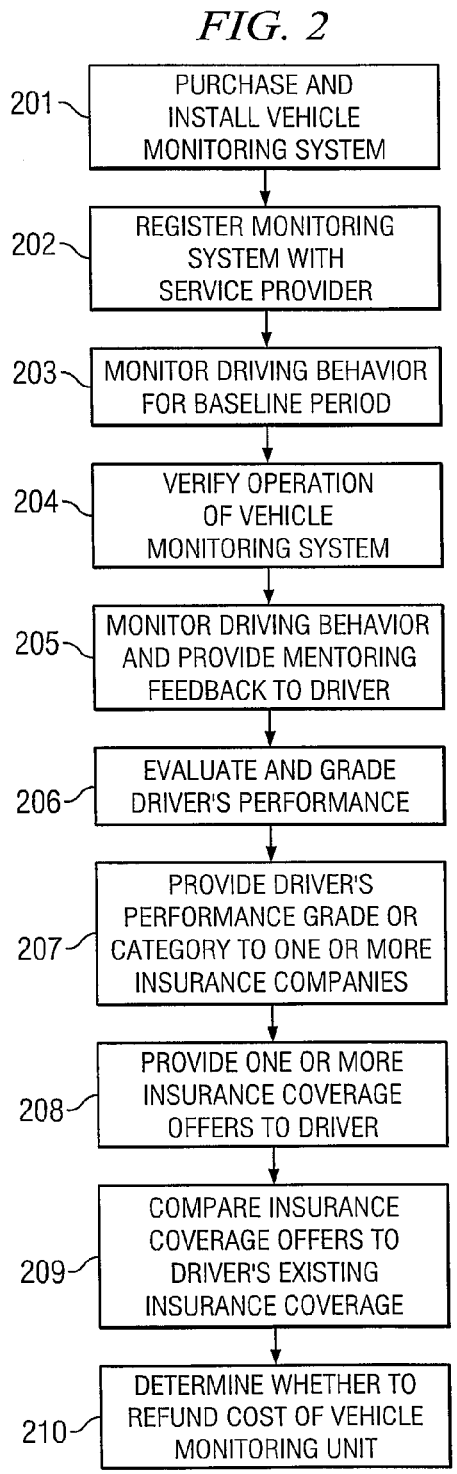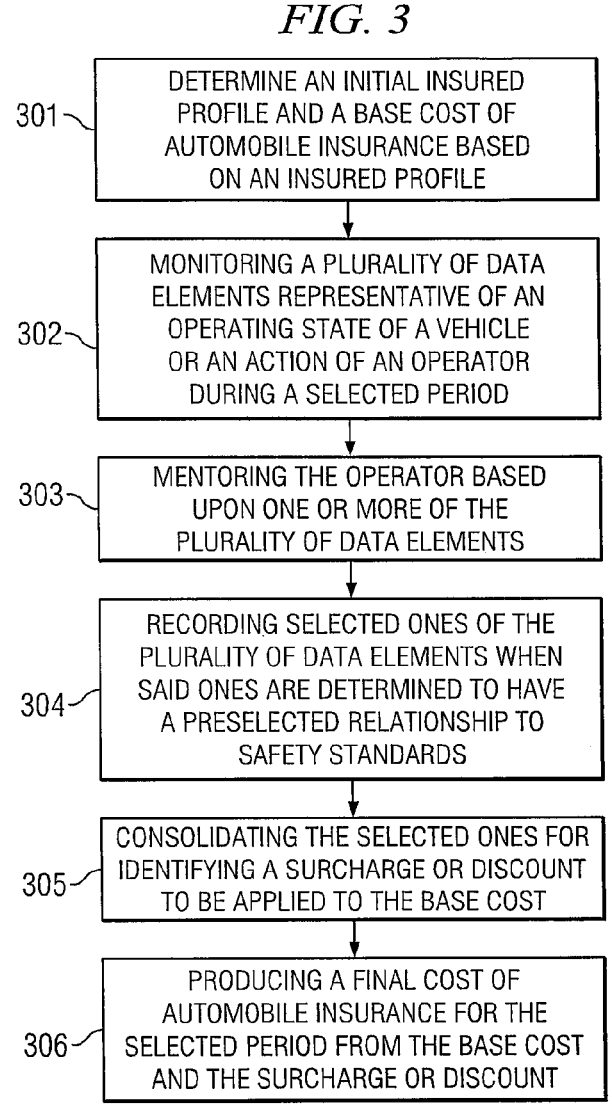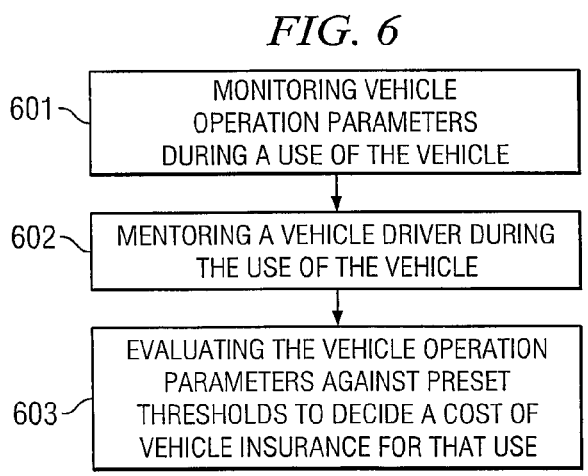

SYSTEM AND METHOD FOR CATEGORIZING DRIVING BEHAVIOR USING DRIVER MENTORING AND/OR MONITORING EQUIPMENT TO DETERMINE AN UNDERWRITING RISK

CROSS-REFERENCE TO RELATED APPLICATIONS

This application relates to the following co-pending and commonly assigned patent application: U.S. patent application Ser. No. 11/779,178, filed Jul. 17, 2007, entitled "System and Method for Providing a User Interface for Vehicle Monitoring System Users and Insurers," which application is hereby incorporated by reference herein in its entirety.

TECHNICAL FIELD

The present invention relates generally to pricing vehicle insurance policies and, more particularly, to a system and method for determining insurance policy rates for drivers that use vehicle monitoring and mentoring equipment.

BACKGROUND

In the automobile insurance industry, insurers typically analyze costs and set prices by categorizing vehicles according territory, type of vehicle, declared future use of the vehicle, type of driver, declared future mileage, and past driver record. The insurer assigns a base price by type of coverage, such as liability or collision coverage, to each territory class according to the insurer's past costs in that territory. The other categories provide additions to and subtractions from the base cost of the territory insurance price.

The price of automobile insurance varies by company and by the type of coverage that is bought, how much coverage is bought, and any deductibles. Vehicle location affects insurance costs such that urban drivers generally pay more for insurance than drivers in rural areas due to higher rates of accidents and theft. Vehicle use also affects insurance rates such that people who use their vehicle for business and long-distance commuting generally pay more than those who drive less miles or less often. The type of vehicle affects insurance rates such that the more expensive the vehicle, the more the driver must pay for insurance.

A driver's age, sex, marital and financial status also affect insurance rates. Accident rates are higher for all drivers under age 25, especially young, single males. Accordingly, insurance prices are higher for these drivers. Driving records are also taken into account when setting insurance rates. Drivers who cause or have been involved in accidents, receive traffic tickets, or make insurance claims generally must pay more than those who do not have accidents, tickets, or claims on their driving record. More recently, it has become an industry standard to use a driver's credit rating to set insurance premiums as studies have shown that credit history is highly predictive of future losses. Accordingly, many insurance companies consider credit history in addition to other factors when determining an individual's insurance rate.

Currently, insurance rates are set for broad, generalized categories of drivers and vehicles, such as those discussed above, without the capability to set future insurance rates based upon the driving habits of an individual driver. U.S. Pat. Nos. 5,797,134 and 6,064,970, both entitled "Motor Vehicle Monitoring System for Determining a Cost of Insurance," and U.S. Pat. No. 6,868,386, entitled "Monitoring System for Determining and Communicating a Cost of Insurance," all assigned to Progressive Casualty Insurance Company (hereinafter "the Progressive Patents") and hereby incorporated by reference herein in their entirety, disclose a system and method in which previously set insurance rates are adjusted based upon driver behavior during the term of the insurance contract. The Progressive Patents disclose a passive vehicle monitoring system that observes driver behavior and vehicle operation, but that does not provide any mentoring, warnings or feedback to the driver. In particular, the system described in the Progressive Patents do not provide any mentoring, warnings or feedback based upon the driver's behavior or operation of the vehicle.

The system described in the Progressive Patents sets an insurance rate for a specified period and then, during the period, monitors the driver. At the end of the period, based upon how the driver performed during the period, the system in the Progressive Patents provides for a possible rate adjustment for the past period. Under the Progressive Patents, a driver is given an insurance rate based upon a standard insurance rating profile. During the period of time covered by that insurance rate, the system in the Progressive Patents monitors the driver and determines if the rate for the past period was correct or if, based upon data from the vehicle monitoring system, the rate set for the past period should be corrected. As a result, the driver may receive a surcharge or a discount to a previously paid insurance premium after the coverage period has ended.

The Progressive Patents do not disclose making adjustments to insurance rates simply based upon the insured using a vehicle monitoring system. The Progressive Patents also do not disclose selecting an insurance rate for a current or future period based upon the use of a vehicle monitoring system. Instead, the system in the Progressive Patents provides vehicle operation data from a monitoring system to the insurer only for the purpose of adjusting previously charged insurance rates. The Progressive Patents do not disclose a system or method for categorizing or grading driver skill or behavior for the purpose of setting present or future insurance rates or for grouping drivers for consideration by insurance companies.

SUMMARY OF THE INVENTION

In one embodiment, the present invention provides a system and method for offering discounted insurance rates to drivers who agree to install vehicle mentoring and/or monitoring equipment in their vehicle. In an embodiment, if the insured driver does not actually install or use the vehicle mentoring and/or monitoring system, their insurance policy may be canceled or the insurance premium or rates modified by the insurance carrier.

In another embodiment of the invention, a service provider, consultant or third party monitors and grades drivers' performance and rates the drivers into categories, such as excellent, good, fair, and poor drivers, for example. The service provider then offers and/or sells data corresponding to groups or blocks of excellent, good, fair, and poor drivers to insurance companies for potential new insurance policies.

In another embodiment of the invention, insurance rates are set for current or future periods and driver behavior is both monitored and mentored during that period by a vehicle mentoring and/or monitoring system. The driver may receive a surcharge or discount at the end of the period based upon their performance during the period.

In a further embodiment of the invention, a driver categorizes or grades his or her own driving ability, such as by selecting whether he or she is an excellent, good, fair, or poor driver. An insurance policy may be offered to the driver with a rate that is based upon the driver's own classification of their driving skill. During the term of the insurance agreement, the driver's performance is monitored by a vehicle mentoring and/or monitoring system. The driver may also receive mentoring from the vehicle monitoring system, such as feedback or warnings when certain speed or acceleration criteria or thresholds are exceeded. During or at the end of the period, the vehicle mentoring and/or monitoring system may categorize, classify or grade the driver's behavior. The grade assigned by the vehicle monitoring system may be compared to the self-assigned grade of the driver. If the grade assigned by the vehicle monitoring system is different from the driver's self-assigned grade then the insurance policy may be rewritten, revoked, and/or terminated.

In another embodiment of the invention, a vehicle monitoring system may be used to provide instantaneous insurance rates based upon a driver's current driving performance. For example, an insurer may agree to provide insurance coverage to a driver for a period with the rate to be determined during the period. The vehicle monitoring system may monitor the driver's performance during the period and in real-time generate or calculate the appropriate insurance rate for the driver. The driver's insurance premium may begin at zero and would accrue during the period. In this embodiment, the driving conditions selected by the driver, such as weather, time of day, route, frequency of trips, and the like would be under the driver's control and, therefore, allow the driver to influence his insurance premium for each trip and/or for the given period.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates one embodiment of a system for implementing the present invention;

FIG. 2 is a flowchart illustrating a method incorporating one embodiment of the present invention;

FIG. 3 is a flowchart illustrating a method incorporating another embodiment of the present invention;

FIG. 4 is a flowchart illustrating a method incorporating another embodiment of the present invention;

FIG. 5 is a flowchart illustrating a method incorporating an additional embodiment of the present invention; and FIG. 6 is a flowchart illustrating a method incorporating another embodiment of the present invention.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Driver performance may be measured using vehicle monitoring equipment that is installed in a vehicle and collects information, such as the vehicle's speed, acceleration, and location. The system may capture data identifying where the vehicle is driven, when the vehicle is driven, and how the vehicle is driven (i.e. driver performance). Such vehicle monitoring devices are described in U.S. patent application Ser. No. 11/805,237, filed on May 22, 2007, entitled "System and Method for Monitoring Vehicle Parameters and Driver Behavior," the disclosure of which is hereby incorporated by reference herein in its entirety. The vehicle monitoring system may receive inputs from internal and external sources and sensors, such as accelerometers, global positioning systems (GPS), vehicle on-board diagnostic systems, seatbelt sensors, wireless device, or cell phone use detectors, alcohol vapor detectors, or trans-dermal ethanol detection. The vehicle monitoring system may be used to evaluate and grade driver behavior, as described in U.S. patent application Ser. No. 11/755,556, filed on May 30, 2007, entitled "System and Method for Evaluating Driver Behavior," the disclosure of which is hereby incorporated by reference herein in its entirety. The vehicle monitoring system may also be used to provide feedback and mentoring to the driver in order improve the driver's performance and driving behavior, such as described in U.S. patent application Ser. No. 11/768,056, filed on Jun. 25, 2007, entitled "System and Method for Monitoring and Improving Driver Behavior," the disclosure of which is hereby incorporated by reference herein in its entirety.

Using a vehicle monitoring and mentoring system, such as one of the devices described in the above-referenced patent applications, a driver's performance can be evaluated. The driver's performance may also be improved, if the driver follows mentoring feedback or warnings from the vehicle monitoring system. Driving performance may be evaluated as a letter grade (for example, A, B, C, D, or F), a number, a percentage, or using a more general category (for example, Excellent, Good, Fair, or Poor). The driver's performance may be evaluated against parameters, thresholds or criteria set in the vehicle monitoring system. Speed thresholds may be set to determine if the driver has exceeded a posted speed limit and/or a maximum selected speed. Multiple levels of speed thresholds may be set and, if any are exceeded, the vehicle monitoring system may also determine the extent and duration of each violation. For example, U.S. patent application Ser. No. 11/805,238, filed May 22, 2007, entitled "System and Method for Monitoring and Updating Speed-By-Street Data," the disclosure of which is hereby incorporated by reference herein in its entirety, discloses a system and method for detecting when a speed threshold has been exceeded. Acceleration thresholds may be set to determine if the driver starts, stops or turns too aggressively. Multiple levels of acceleration thresholds may be established as described above for speed thresholds. Other parameters, thresholds and criteria may be established to monitor and evaluate other driver and vehicle operating conditions. For example, thresholds may also be set in other sensors such as seatbelt, wireless device, and alcohol vapor detectors to further evaluate the driver's behavior. The vehicle monitoring system may record the extent and duration to which any threshold is violated and uses that information to evaluate the driver.

The driver's behavior and driving performance may be improved by providing mentoring feedback when a particular threshold is violated. Thresholds are set, as described above, for numerous vehicle operating parameters, such as speed, acceleration, and the like. Upon detection that one of these thresholds has been exceeded, such as driving faster than a posted speed limit, the vehicle monitoring system may provide audible and/or visual feedback cues to mentor the driver. For example, an audible warning tone or voice message may indicate that a speed limit has been exceeded. Similarly, a warning light, icon, graphic or text message may be displayed to the driver to indicate that the speed limit has been exceeded. If the driver does not correct the speeding condition or other threshold violation, then a notice may be sent to a central monitoring server, parent, fleet manager or other supervisor or authority. On the other hand, if the driver chooses to follow the mentoring cues and reduces the vehicle's speed to or below the posted speed limit within an acceptable time, then the monitoring system may take into account the degree to which the driver reacted to the mentoring cues.

In some embodiments of the invention, a driver may receive a higher evaluation if it is determined that he or she is more likely to react to the mentoring cues. For example, if a driver consistently and quickly corrects a speeding violation after a mentoring cue or warning is broadcast by the vehicle monitoring system, then that driver may be evaluated higher than a driver who has the same or fewer number of violations but allowed the violation to continue uncorrected longer.

In one embodiment, driver evaluation or grading by a vehicle monitoring system may be used in the insurance industry. For example, insurance rates may be set or discounted depending upon whether a driver uses monitoring and/or mentoring equipment in his or her vehicle. This would allow the driver to trade some privacy for a better insurance rate. By allowing the vehicle to be monitored, the driver would be offered a lower insurance rate. For some drivers, merely knowing that the monitoring equipment is installed in their vehicles would be sufficient motivation to drive more carefully and, therefore, may result in fewer claims filed with the insurance company (referred to as "the halo effect"). Additionally, in exchange for a lower rate, the insurance company would receive data from the vehicle monitoring system, which it could use for any purpose, such as setting insurance rates, analyzing driver behavior, or identifying high risk vehicles, drivers, locations, risky locations at specific times of day, risky locations according to traffic density, and/or risky locations according to environmental conditions. The insurance company's vehicle monitoring equipment may simply record vehicle information and report that information back to the insurance company or another central location. Alternatively, the insurance company's equipment may also provide mentoring feedback, warnings and cues to the driver. An insurance company may offer one level of discounted rates to drivers who use the vehicle monitoring equipment and a second level of discounted rate to drivers who use equipment that also provides driver mentoring.

In other embodiments of the invention, a driver evaluation service may monitor groups of drivers and assign driving grades to those drivers or otherwise categorize the drivers, for example, as excellent, good, fair, or poor drivers. Once the drivers are classified by driving grade or category, then the driver evaluation service may offer these groups of drivers to insurance companies for coverage. The service may also offer advice and/or mentoring to the group of drivers to assist them in maintaining and/or improving their driver performance "grade" in an effort to keep or secure a better insurance rate. For example, after monitoring a number of drivers and placing them in excellent, good, fair, or poor driver groups, information about these groups of drivers is provided to insurance companies. The insurance companies may then evaluate the drivers individually or in groups and decide whether to offer insurance coverage to individual drivers or to the group based upon the driver rating.

In one embodiment, vehicle monitoring equipment is installed in the vehicles. The drivers then use the vehicle as they normally would, and their driving performance is evaluated over time. Some of the drivers will be classified as excellent drivers, if, for example, they do not exceed speeding or acceleration thresholds or create an exception condition for any other monitored parameter, such as seatbelt use, cell phone use, or alcohol use. This group of excellent drivers may then be offered to insurance companies by the driver evaluation service for automobile insurance coverage. The insurance companies may then bid on the opportunity to provide coverage to this group of excellent drivers. This would allow the insurance company to set lower rates for a group of drivers that are known to be excellent drivers. The excellent-driver rates may be set with or without consideration of other factors, such as location, driver age, driver sex, driver insurance claim history, vehicle type, or credit rating.

Another group of drivers may be classified as poor drivers, if, for example, they consistently speed, consistently exceed acceleration limits by hard braking or jackrabbit starts, do not use seatbelts, use cell phones while driving, drive under the influence or meet other criteria placing them into a category of "poor" driving performance. This group of poor drivers may be offered to insurance companies by the driver evaluation service for automobile insurance coverage. The insurance companies may bid for the opportunity to provide coverage to this group of poor drivers. This would allow the insurance company to set higher rates for a group of drivers that are known to be poor drivers and, therefore, more likely to file or cause insurance claims to be filed. The poor-driver rates may be set with or without consideration of other factors, such as location, driver age, driver sex, driver insurance claim history, vehicle type, or credit rating. An insurance company may be willing to take on a group of poor drivers if it is able to manage the balance between its premium and the expected risk.

Similarly, other groups of drivers having good or fair driving habits may be offered individually or in a group to insurance companies for bidding. Alternatively, drivers may be grouped into categories using any other grading system, such as groups of drivers with A, B, C, D and F driving grades. The present invention provides a system and method for grouping drivers with similar driving skills, habits, behavior or capability. The drivers in these groups are considered for coverage at the same time by insurance companies, thereby allowing the insurance companies to set rates based on known driving records and to assess risk based on those records. Using the present invention, the insurance companies may assign a risk level to each category of driver. The insurance company may then bid on each category by setting its bid price or proposed premium based upon the expected risk created by drivers in a particular category.

An auction involving drivers seeking insurance and the bidding by the insurance company may take any form. In one embodiment of the invention, the amount bid by the insurance company may be a payment offered by the insurance company to the driver evaluation service or to another insurer. The amount bid may correspond to an offer to take over existing insurance policies for the group of drivers. Alternatively, the bid may represent an automobile insurance rate or premium that the insurance company is willing to assign to drivers in the group. The bidding process may be known to the drivers or it may occur without their knowledge. For example, in one embodiment, the drivers enroll for insurance with one insurer, who then resells their insurance to other companies in a secondary market via the bidding process. Either the original insurer or a secondary insurer may service the account and interface with driver after the account is sold at auction. If the original insurer continues to service the account, claims may be made to the original insurer, which in turn may collect reimbursement from the secondary insurer. Alternatively, the secondary insurer may be identified to the driver as the current insurer and payments would be made to, and claims would be filed with, the secondary insurer.

In another embodiment, the drivers may receive insurance coverage for a limited period of time, such as one or more months, from a first insurance company. As part of the agreement with the first insurance company, the drivers would agree to install and use vehicle monitoring equipment in their car during the limited period with the understanding that—after the limited period ends—they will be offered an insurance policy for a standard period, such as six months, with a rate based upon their driving grade or evaluation. During the limited period, the vehicle monitoring system would observe the driver's performance and driving behavior and assign a grade or classification to each driver. The first insurance company would then offer to accept bids from other insurance companies for insurance policies for various groups or classifications of drivers. If a second insurance company successfully bids for a group of drivers, the drivers in that group would receive insurance policies from the second insurance company at the bid rate or premium. It will be understood that the term group as used herein may mean one or more drivers. In addition to proposing an insurance rate for a group of drivers in its bid, the second insurance company may additionally or alternatively propose a fee, such as a referral fee, to be paid to the first insurance company for the drivers' information.

In another embodiment, when drivers apply for insurance coverage, they may select their policy based upon a self evaluation of their driving performance. Drivers may be given a list of criteria defining what is considered to be an excellent, good, fair, or poor driver. For example, an excellent driver may be defined as someone who never exceeds speeds that are more than 5% over the posted speed limit and who never exceeds 70 MPH at all. Alternatively, an excellent driver may be defined as someone who exceeds posted speed limits less than 5% of the time and never exceeds 70 MPH; a good driver as someone who exceeds posted speed limits no more than 10% of the time, a fair driver as someone who exceeds posted speed limits no more than 20% of the time, or has any incident of speeds greater than 80 MPH; and a poor driver as someone who exceeds posted speed limits more than 20% of the time, routinely exceeds 75 MPH, or has any incident of speeds greater than 90 MPH. It will be understood that any other alternative criteria may be established to define excellent, good, fair and/or poor drivers. Alternatively, drivers may select from criteria that define driving performance rated A, B, C, D and F. Based upon a driver's self-identified category or grade, the insurance company would determine the rate to be offered for coverage of that individual. This would allow drivers who are, or think they are, excellent or good drivers a chance to prove it and get a low insurance rate.

As a condition for offering a particular rate, the insurance policy may require the driver to install vehicle monitoring equipment. Once the policy is in effect and the vehicle monitoring equipment is installed, the insurance company would be able to monitor and grade the driver's actual driving performance and behavior. If the driver's actual driving grade was as good or better than their self-selected category, then the insurance company would keep the policy in effect—assuming there was no other breach of the insurance agreement. In some embodiments, if the driver's actual grade was better than the driver expected, then the insurance company may reduce the driver's rates for future and/or for past periods. If the driver's grade is worse than the driver selected, then the insurance company may decide to drop certain coverages and/or to cancel the driver's policy. Alternatively, the insurance company may increase the policy rate to compensate for the driver's actual driving performance and higher risk of future claims. In some embodiments, the insurance company may issue a surcharge or a discount to a previously paid insurance premium based upon the driver's graded performance.

FIG. 1 illustrates one embodiment of a system for implementing the present invention. A plurality of drivers who are seeking insurance drive vehicles 101. Vehicle monitoring and/or mentoring equipment 102 is installed in vehicles 102. Monitoring device 102 may be self contained, such as a single unit mounted on a windshield or dashboard of vehicle 101. Alternatively, the monitoring device may include multiple components, such as a processor or central unit mounted under a car seat or in a trunk of the vehicle and a user interface mounted on a dashboard or windshield. Similarly, monitoring device 102 may have a self-contained antenna in the unit or may be connected to remotely mounted antennas for communication with remote systems.

Vehicle monitoring units 102 may be connected to an on-board diagnostic (OBD) system or data bus in the vehicle. Information and data associated with the operation of the vehicle may be collected from the OBD system, such as engine operating parameters, vehicle identification, seatbelt use, door position, etc. The OBD system may also be used to power the vehicle monitoring device. Vehicle monitoring system 102 may receive inputs from internal and external sources and sensors such as accelerometers, global positioning systems (GPS), vehicle on-board diagnostic systems, seatbelt sensors, wireless device, or cell phone use detectors, alcohol vapor detectors, or trans-dermal ethanol detection. In one embodiment, the vehicle monitoring device is one of the types described in U.S. patent application Ser. No. 11/755,556, filed on May 30, 2007, entitled "System and Method for Evaluating Driver Behavior," the disclosure of which is hereby incorporated by reference herein in its entirety.

Information may be exchanged between vehicle monitoring system 102 and central monitoring system or server 104 in real-time or at intervals. For example, the vehicle operation parameters may be transmitted to server 104 via communication network 103, which may be a cellular, satellite, WiFi, Bluetooth, infrared, ultrasound, short wave, microwave or any other suitable network. Information sent to communication network 103 may then be forwarded via Internet 110 or any other public or private network to server 104 or database 105. Server 104 may process the parameters and/or store the data to database 105, which may be part of server 104 or a separate device located nearby or at a remote location. Users may access the data on server 104 and database 105 using terminal 106, which may be co-located with server 104 and database 105 or remotely coupled via the Internet or other network connection. In some embodiments, the data captured by monitoring system 102 in vehicle 101 may be transmitted via a hardwired communication connection, such as an Ethernet connection that is attached to vehicle 101 when the vehicle is within a service yard or at a base station or near server 104. Alternatively, the data may be transferred via a flash memory, diskette, or other memory device that can be directly connected to server 104 or terminal 106. Data, such as driving performance or warning thresholds, may also be uploaded from central server 104 to vehicle monitoring device 102 in a similar manner.

In one embodiment of the invention, the data captured by vehicle monitoring system 102 is used to monitor, mentor, grade, or otherwise analyze a driver's behavior during certain events. For example, if vehicle 101 is operated improperly, such as speeding, taking turns too fast, colliding with another vehicle, or driving in an unapproved area, then monitoring unit 102 or server 104 may assign a lower grade to the driver's performance. Additionally, if the driver's behavior is inappropriate or illegal, such as not wearing a seatbelt or using a cell phone while driving, the driver's performance evaluation may also be lowered even if this activity does not coincide with improper operation of the vehicle.

The vehicle monitoring system may have the capability of disabling the vehicle under certain conditions. For example, U.S. patent application Ser. No. 11/756,315, entitled "System and Method for Remotely Deactivating a Vehicle," and filed on May 31, 2007, the disclosure of which is hereby incorporated by reference herein in its entirety, discloses a vehicle monitoring system that is adapted to disable or deactivate a vehicle under preset conditions or upon command from an authority or supervisor. In another embodiment of the invention, the preset conditions or command from an authority or supervisor may be associated with an insurance status of the driver. For example, if an insurance company, supervisor, or other authority determines that the driver is uninsured, underinsured, lacking coverage required in a particular jurisdiction, that the driver's insurance premiums are delinquent, and/or if the vehicle is not properly registered and/or delinquent in registration with the state, then the vehicle monitoring system may be directed to disable or deactivate the vehicle. Alternatively, the vehicle monitoring system may provide warnings or other mentoring cues to the driver if it is determined that the driver (and/or vehicle) is uninsured, underinsured, lacking coverage required in a particular jurisdiction, or that the driver's insurance premiums are delinquent. Additionally, the system may provide warnings or other mentoring cues to the driver if it is determined that the vehicle is not currently registered and/or is delinquent in its registration. This alternative would allow the driver to continue to operate the vehicle, but would put the driver on notice that he or she is driving at their own risk. Additionally, the system may alert the driver with ever increasing warnings of imminent and/or pending vehicle disablement.

Driving performance evaluation and grading may be performed by monitoring device 102 and/or by central server 104. The driver's behavior is typically evaluated against predetermined vehicle operation parameters, thresholds or other criteria. The driver's performance may monitored while driving vehicle 101 with monitoring device 102 installed for some period, such as a number of weeks or months, or for some number of miles driven or for some number of trips, for example. After monitoring device 102 has sufficient exposure to the driver's performance, the driver is assigned a driving grade or category. This grade or category may be assigned by monitoring device 102, or performance data from monitoring device 102 may be provided to central server 104, which may also assign a grade or category to the driver. Each driver's grade, category or other classification may be stored to database 105. Other driver information may also be stored in database 105, such as driver profile data, insurance policy data, contact information, license information and the like.

Users may access the driving performance data and grades that are stored in database 105 via terminal 106. Additionally, insurance companies or agents 107-109 with proper and/or appropriate authority, may also access the data and other driver information directly from database 105 or via central server 104. Insurance companies 107-109 may access the driver data via the Internet or other network connection. Monitoring devices 102 and central server 104 may be operated by one or more insurance companies 107-109 or by another company or service provider outside the insurance industry, such as the manufacturer or retailer of the vehicle monitoring system, again, all assuming proper and/or appropriate authorization is given. The monitoring system operator may group the drivers into categories, such as excellent, good, fair or poor, and solicit bids or offers from insurance companies 107-109 to insure the drivers.

The monitoring system operator may post a listing on a website, database, FTP site, Blog, electronic bulletin board or other location to notify insurance companies 107-109 that certain groups of drivers are seeking insurance coverage. Insurance companies 107-109 may evaluate the drivers' driving performance grades or categories and determine if they want to bid and/or offer insurance coverage to these drivers. The insurance companies may offer to insure one or more drivers with a particular category or group. The insurance companies may post or send their bid or other offer for insurance coverage to central server 104 to be passed on to the driver. Alternatively, an insurance company may contact a driver directly to offer coverage.

FIG. 2 is a flowchart illustrating a method incorporating one embodiment of the present invention in which the vehicle monitoring system is operated by a service provider that is not part of the insurance industry. It will be understood that not all of the steps illustrated in the Figures are required and, if used, the steps do not need to occur in the order shown. In other embodiments, more or fewer steps may occur in an order other than that illustrated in Figures. In one embodiment, the service provider may offer, such as in an advertising or marketing campaign, the opportunity to drivers to lower their insurance rates if they use the vehicle monitoring system. The service provider may sell, rent, lease or give away the vehicle monitoring devices to drivers in step 201. The service provider may have its own distribution network or outlets or may use one or more national or local retailers to distribute the vehicle monitoring devices. The monitoring system may be installed in the vehicle by the driver, by the retailer, or by another third party installation vendor. The cost of installation may be included in the price of the vehicle monitoring device, or it may be a separate cost, or it may be free.

After the vehicle monitoring system is purchased, the driver registers the system with the service provider in step 202, such as via an Internet website, a telephone call to a service center, by electronic mail, by postal mail, or by another means. A system and method for registering drivers is disclosed in U.S. patent application Ser. No. 11/758,444, entitled "System and Method for Automatically Registering a Vehicle Monitoring Device," filed on Jun. 5, 2007, the disclosure of which is hereby incorporated by reference herein in its entirety. In one embodiment, the registration process is separate from the purchase and/or installation of the vehicle monitoring device. Alternatively, registration may take place when the vehicle monitoring device is purchased or installed. During the registration process, the driver may provide basic or detailed information, such as, for example, contact information, vehicle information, credit information, driving history, and/or insurance information.

In step 203, the vehicle monitoring system begins monitoring the driver's behavior during a baseline period. During this period, the vehicle monitoring device may be configured to observe and record the driver's performance without providing any mentoring feedback or cues. In some embodiments, the vehicle monitoring system may disable all lights, sounds and other output so that the driver will operate the vehicle without being aware of the vehicle monitoring device. This baseline period would allow the vehicle monitoring system to determine an initial performance level for the driver to be later compared to "mentored" driving performance, enabling a comparative measure of improvement. During the baseline period, in step 204, the vehicle monitoring system may be evaluated to verify that the vehicle monitoring device is operating properly. Proper operation of the vehicle monitoring device may be also be verified at other times and operation checks may occur routinely during operation of the device. After confirming that the vehicle monitoring system is operating properly and after the baseline evaluation of the driver is completed, in step 205, the vehicle monitoring system may begin providing mentoring feedback in addition to monitoring the driver's behavior. The driver may be prompted to initiate mentoring feedback or notified that such feedback is going to be provided. The monitoring beginning in step 205 may represent the beginning of an evaluation period that will result in a driving grade or category to be provided to insurance companies. It will be understood that in other embodiments, the baseline period may be skipped or deleted, may occur at another time, or may be otherwise modified.

In step 206, after the driver's performance has been observed for some period, the vehicle monitoring system evaluates and grades the driver. The length of the observation period is variable and may be selected by the service provider or the driver. Different observation periods may be required by different insurance companies or service providers. The duration of the observation period may be dependent upon how the driver reacts to the mentoring feedback. For example, a shorter observation period may be used if the driver reacts quickly to the mentoring cues, while a longer period may be used if the driver appears to ignore or react slowly to mentoring. The duration of the observation period may also be determined by the driver's evaluation during or after the baseline period. For example, the observation period may be shorter if the driver received a good or excellent initial evaluation and continued to perform in the same manner after the observation period began.

Once the driver's performance has been evaluated and graded, the driver may be categorized into a classification, such as an excellent, good, fair, or poor driver. It will be understood that any other classification that is useful or helpful to the service provider and/or insurance companies may also be used. In step 207, the driver's performance grade or category is provided to one or more insurance companies for evaluation. The driver's information (with the driver's permission) may be posted, such as on a secure website or electronic bulletin board, for any interested insurance company to review, or the driver's information may be sent or otherwise provided to insurance companies that have registered with the service provider looking for said individuals with certain driving scores or grading. The insurance companies may consider drivers individually or as groups for coverage. One or more insurance companies may provide an insurance coverage offer to a driver in step 208. The insurance coverage offer may be provided directly to the driver, or the offer may be provided to the driver via the service provider. The driver may then accept the insurance coverage and enter into an agreement with a selected insurance company.

The service provider may receive payment for the service in one or more ways, such as through the sale of the vehicle monitoring system to drivers or to retailers. In some embodiments, the vehicle monitoring system does not require a monthly user fee; however, in other embodiments the driver may pay a monthly user fee for the use of the vehicle monitoring system. The driver may pay a fee to obtain the driver's evaluation or grade. In other embodiments, the insurance company and service provider may enter into an agreement by which the insurance company pays for access to all or some of the driver evaluation data. In still other embodiments, the insurance company may pay a fee or royalty to the service provider for each new insurance contract that results from the service. In the alternative, the driver may pay the service provider a monthly fee for the mentoring/monitoring hardware to be present and installed on their vehicle whereas insurance coverage is free and a benefit, included in the monthly service fee. The driver is paying a monthly fee for the mentoring/monitoring service and getting insurance coverage as a fringe benefit, no additional charge.

In certain embodiments, the service provider may offer or promise, such as part of an advertising or marketing campaign, that drivers can or might lower their current insurance premiums by a given percentage or amount. When the driver registers for the service, in step 202, for example, he or she may enter their current insurance coverage information, such as type of insurance, coverage limits, and insurance rates. The service provider may market or advertise the service by offering to refund some or all of the vehicle monitoring system cost if the user does not receive insurance offers that provide insurance premium savings of a given percentage or amount. In the embodiment illustrated in step 209, the service provider compares the insurance coverage offers that are provided to the driver in step 208, if any, and driver's existing insurance coverage, if any. In step 210, the service provider determines if the cost of vehicle monitoring unit should be refunded to the driver based, for example, upon the type of insurance coverage that was offered to the driver or a cost difference in insurance premiums.

FIG. 3 is a flowchart of a method incorporating another embodiment of the present invention. The method illustrated in FIG. 3 is directed to a process for determining a cost of automobile or other vehicle insurance for a selected period based upon monitoring, recording and communicating data representative of operator and vehicle driving characteristics during the period. The cost may be adjustable by relating the driving characteristics to predetermined safety standards. The safety standards may be reflected in the operating parameters, thresholds or criteria used by a vehicle monitoring system. In step 301, an initial insured profile and a base cost of automobile insurance based on said insured profile are determined. In step 302, a plurality of data elements representative of an operating state of a vehicle or an action of the operator are monitored during the selected period. The monitoring may be accomplished by a vehicle monitoring system as described herein.

In step 303, the operator is mentored based upon one or more of the plurality of data elements. The mentoring may include, for example, audible or visual warnings, feedback or cues that are triggered by one or more of the plurality of data elements. In step 304, selected ones of the plurality of data elements are recorded when the selected ones are determined to have a preselected relationship to the safety standards. The preselected relationship may be determined, for example, using the operating parameters, thresholds or criteria that are configured in a vehicle monitoring system. In step 305, the selected ones are consolidated for identifying a surcharge or discount to be applied to the base cost. Finally, in step 306, a final cost of automobile insurance for the selected period is produced from the base cost and the surcharge or discount.

In the process illustrated in FIG. 3, the recording step may comprise identifying a trigger event associated with one of the data elements having the preselected relationship and recording both the one data element and trigger information representative of the trigger event. The method may also include immediately communicating to a central control station, via an uplink, information representative of a trigger event associated with one of the data elements. The trigger event response information generated by the control station may also be recorded. Derived data elements may also be generated from the data elements, and the consolidating step may further comprise accumulating calculated and derived data elements.

The monitoring in the illustrated example may comprise calculating a total driving time of the vehicle and classifying relative portions of the driving time amongst a plurality of rating classifications comprising high, medium, and low risk driving times; and further identifying geographic locations of driving area and classifying the identified geographic location for area of driving amongst a plurality of classifications comprising high, medium, and low risk driving locations. The consolidating step may further comprise calculation of a percentage of drive time in the drive time classifications and the drive location classifications.

In one embodiment, at least a portion of the data elements are within an awareness and selected control of the operator and the process further comprises adjusting by an operator of the operator driving characteristics thereby causing a change in the data elements to obtain the discount in the final cost. The base cost may be for a predetermined period of time, and the adjusting by the operator may be set to occur at predetermined intervals within the predetermined period. The predetermined period of time may comprise two years and the predetermined intervals may comprise monthly intervals.

FIG. 4 is a flowchart illustrating a method incorporating another embodiment of the present invention. The method illustrated in FIG. 3 is directed to a process for generating a database comprising data elements representative of operator or vehicle driving characteristics. In step 401, a plurality of the data elements representative of an operating state of a vehicle or an action of the operator are monitored during a selected time period. In step 402, the operator is mentored based upon one or more of the plurality of data elements. In step 403, selected ones of the plurality of data elements are recorded into the database when the selected ones are determined to be appropriate for recording relative to determining a cost of insurance for the vehicle during the selected time period. The selected ones may include a time and location of vehicle operation and a corresponding log of vehicle speed for the time and location.

The database may comprise data elements representative of operator or vehicle driving characteristics for a selected time period including a time and location of vehicle operation and a corresponding log of vehicle speed for the time and location. The database may be used to determine an insurance charge for the vehicle operation for the selected time period. The data elements may comprise raw data elements, derived data elements and calculated data elements.

FIG. 5 is a flowchart illustrating a method incorporating an additional embodiment of the present invention. The method illustrated in FIG. 5 is directed to a process for insuring a vehicle operator for a selected period based upon operator driving characteristics during the period. In step 501, an initial operator profile is generated. In step 502, operator driving characteristics are monitored during the selected period. In step 503, the operator is mentored based upon one or more of the driving characteristics. Finally, in step 504, a cost of vehicle insurance for the period is decided upon based upon the operating characteristics monitored in that period.

In another embodiment of the invention, instead of setting insurance rates that over a future or past period, insurance rates may be determined instantaneously or in real-time on a use-by-use basis for a vehicle. This embodiment allows a driver to control the size of his or her insurance premium by choosing whether to drive, when to drive and in what conditions to drive. Instead of prepaying for a specific period of insurance coverage, such as a month or six months of coverage, the driver may install a vehicle monitoring system in the vehicle and elect to be charged on a use-by-use basis. This system may be analogized to a telephone bill. There may be a base charge amount or fee just for having the insurance policy (similar to a basic charge for having a telephone in your home and connected to the telephone network); however, the charges above the base amount are incurred only when the vehicle is used (similar to charges incurred for each toll call that is made on your telephone).

If the driver never uses the vehicle, then the major risk to the insurance company is that the car will be hit, vandalized otherwise damaged while parked. Once the driver uses the vehicle, then the risk increases as the vehicle is exposed to other vehicles, driver impairment, road hazards, weather conditions, equipment failure, and the like. In this embodiment, when the driver uses the vehicle, the vehicle monitoring system evaluates vehicle operating parameters, environmental conditions, driver impairment and performance, road and traffic conditions, and other parameters to create an insurance cost or rate for that use.

FIG. 6 is a flowchart illustrating a method incorporating an embodiment of the present invention. The method illustrated in FIG. 6 is directed to a process for determining the cost of vehicle insurance. In step 601, vehicle operation parameters are monitored during a use of the vehicle. In step 602, which step may be optional and is not required for all embodiments of the invention, a vehicle driver is mentored during the use of the vehicle. In some embodiments, the rate for each use may depend upon whether and to what extent mentoring was provided to, and/or followed by, the driver. In step 603, the vehicle operation parameters are evaluated against preset thresholds to decide a cost or premium for vehicle insurance for that use.

The vehicle operation parameters may comprise vehicle speed and acceleration parameters, thresholds or criteria as described herein. Any other vehicle-specific operation parameters may also be used, such as parameters available for monitoring via an on-board diagnostic system. The insurance cost or premium may be increased or enhanced for a use in which the driver speeds, repeatedly breaks hard, performs hard turns, or commits similar perceived high risk acts.

The vehicle operation parameters may also comprise driver impairment or performance thresholds, such as the driver's use of seatbelts or turn signals, detection of cell phone use, detection of alcohol or drug use, fatigue detectors (e.g. blink rate sensors), or any other criteria that indicate a driver may be in less than optimal mental or physical condition for driving. The insurance cost or premium may be increased or enhanced for a use in which the driver is impaired or not paying adequate attention to the road or the system detects a less than optimal vehicle operation performance for any reason (i.e. impairment, fatigue, physical distraction, emotional distraction, etc.).

The vehicle operation parameters may also comprise environmental conditions. For example, the vehicle monitoring system may be configured to determine or be alerted to current weather conditions. In one embodiment, server 104 may transmit data to the vehicle monitoring system related to current weather conditions or the vehicle monitoring system may receive weather information from a public or private source, such as a radio weather warning broadcast or a for profit weather broadcast/webcast company. The insurance cost or premium may be increased or enhanced for a use in which the driver chooses to drive the vehicle during an actual, warning or watch for a tornado, thunderstorm, flood, hail, or other potentially damaging environmental conditions.

The vehicle operation parameters may further comprise road or traffic conditions in the area of the use. For example, the vehicle monitoring system may be configured to determine or be alerted to current road or traffic conditions. In one embodiment, server 104 may transmit data to the vehicle monitoring system related to current road or traffic conditions or the vehicle monitoring system may receive such information from a public source, such as a radio broadcast. The insurance cost or premium may be increased or enhanced for a use in which the driver chooses to drive the vehicle in areas of extraordinarily heavy traffic, on roads of poor condition, or in areas, such as intersections, known to have frequent accidents.

The insurance cost or premium may be billed to the driver for each use individually, or the costs of vehicle insurance may be consolidated for a plurality of uses and billed together. The plurality of uses may comprise all of the uses during a period, such as one or more days, weeks, months, years or portion thereof. The present invention allows an insurer to offer present insurance pricing based on a "metered" approach wherein the insurance cost is calculated or determined in real-time depending on how, where, and when a vehicle is operated. Environmental conditions may be evaluated to add to the insurance cost for a given trip or use. For example, the insurance coverage premium or cost for using the vehicle between home and work on a Monday morning might be $5, for use between home and work on a Sunday afternoon might be $3, use between home and work on any day with a heavy snow advisory warning might be $8, and a drive in the country on a weekend day might be $1. These events and amounts are merely presented as examples. It will be understood that the vehicle use may be broken down or analyzed in any manner for use in determining metered insurance rates, such as rating by time of day, day of week, time of year, actual or predicted weather conditions, type of road, traffic load on road, recreational use, commercial use, number of occupants, age of driver, and the like.

In one embodiment, such a pay-as-you-go or real-time insurance billing system may be used by a driver who rarely uses his or her vehicle, for example, because the driver has infrequent need for the vehicle's use, such as someone who usually uses public transportation, or because the vehicle is a special use vehicle that is infrequently required, such as a construction vehicle (e.g. bulldozer or backhoe), airplane, or boat. In other embodiments, a vehicle that is used by multiple drivers, such as a rental car, may use a use-based insurance pricing method to facilitate distribution of the vehicle insurance costs among multiple drivers. Such a use-based insurance pricing approach may be used to require drivers of a shared vehicle to pay more if they were more reckless or higher risk than other drivers of the same vehicle, thereby allowing for a more fair distribution of the insurance costs.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining a cost of automobile insurance for a selected period based upon monitoring, recording and communicating data representative of operator and vehicle driving characteristics during said period, whereby the cost is adjustable by relating the driving characteristics to predetermined safety standards, the method comprising:
    monitoring, through electronic software operating in conjunction with electronic computer hardware, vehicle operation during a baseline period, wherein the electronic software is operable to provide feedback to a driver of a vehicle;
    disabling feedback during the baseline period;
    determining, through electronic software operating in conjunction with electronic computer hardware, a base cost of automobile insurance based at least in part on the vehicle operation during the baseline period;
    monitoring, through electronic software operating in conjunction with electronic computer hardware, vehicle operation parameters during a period after the baseline period;
    mentoring, through electronic software operating in conjunction with electronic computer hardware, the driver during operation of the vehicle based at least, in part upon at least one vehicle operation parameter exceeding threshold;
    determining a reaction of the driver in response to the mentoring;
    determining an adjustment to the base cost based at least in part upon the reaction; and
    determining, through electronic software operating in conjunction with electronic computer hardware, a final cost of automobile insurance for the period, the final cost based at least in part upon the adjustment.

2. A method of insuring a vehicle operator for a selected period based upon operator driving characteristics during the period, comprising:
    generating, through electronic software operating in conjunction with electronic computer hardware, an initial operator profile;
    monitoring, through electronic software operating in conjunction with electronic computer hardware, vehicle operation parameters during a period of time;
    mentoring, through electronic software operating in conjunction with electronic computer hardware, a driver of a vehicle, during operation of the vehicle, based at least in part upon at least one vehicle operation parameter exceeding a threshold;
    determining, through electronic software operating in conjunction with electronic computer hardware, a percentage of the time that the at least one vehicle operation parameter is exceeding the threshold;
    determining a reaction of the driver in response to the mentoring; and
    determining, through electronic software operating in conjunction with electronic computer hardware, a cost of vehicle insurance for the period based at least in part upon the reaction and the percentage of time.

3. The method of claim 2, wherein the vehicle operation parameters comprise vehicle speed and acceleration.

4. The method of claim 2, wherein the vehicle operation parameters comprise driver impairment thresholds.

5. The method of claim 2, wherein the vehicle operation parameters comprise environmental conditions during the use.

6. The method of claim 2, wherein the vehicle operation parameters comprise road or traffic conditions in the area of the use.

7. The method of claim 2, further comprising:
determining, through electronic software operating in conjunction with electronic computer hardware, costs of vehicle insurance for a plurality of uses.

8. The method of claim 7, wherein the plurality of uses comprise all of the uses during a period.

9. The method of claim 8, wherein the period is one month.

10. The method of claim 2, wherein the cost of vehicle insurance further comprises a basic policy cost.

11. The method of claim 1, further comprising enabling feedback during the period after the baseline period.

12. The method of claim 2, wherein the period comprises a baseline period and a subsequent period, and the method further comprising:

disabling the mentoring during the baseline period;
enabling the mentoring during the subsequent period; and
determining driver habits based at least in part upon vehicle operation parameters during the baseline period and vehicle operation parameters during the subsequent period.

13. The method of claim 2, further comprising:
monitoring vehicle operation parameters during a second period of time;
determining a second percentage of time that the at least one vehicle operation parameter is exceeding the threshold;
determining a difference between the second percentage of time and the percentage of time; and
wherein the cost of vehicle insurance is further based at least upon the difference.

* * * * *

UNITED STATES PATENT AND TRADEMARK OFFICE
CERTIFICATE OF CORRECTION

| | | |
|---|---|---|
| PATENT NO. | : 8,577,703 B2 | Page 1 of 1 |
| APPLICATION NO. | : 11/779176 | |
| DATED | : November 5, 2013 | |
| INVENTOR(S) | : McClellan et al. | |

It is certified that error appears in the above-identified patent and that said Letters Patent is hereby corrected as shown below:

In the Specification

Column 1
Line 27-28, change "according territory" to --according to territory--

Column 2
Line 10, change "do not" to --does not--

Column 8
Line 4, change "vehicles 102" to --vehicles 101--

Column 10
Line 66, change "may be also be" to --may also be--

Column 13
Line 55, change "upon based upon" to --based upon--

In the Claims

Column 16, Claim 1
Line 26-27, change "exceeding threshold" to --exceeding a threshold--

Signed and Sealed this
Third Day of June, 2014

Michelle K. Lee
*Deputy Director of the United States Patent and Trademark Office*